Aug. 11, 1942.  S. M. DUNN  2,292,871
ANTISIPHONAGE RELIEF VALVE
Filed May 19, 1941
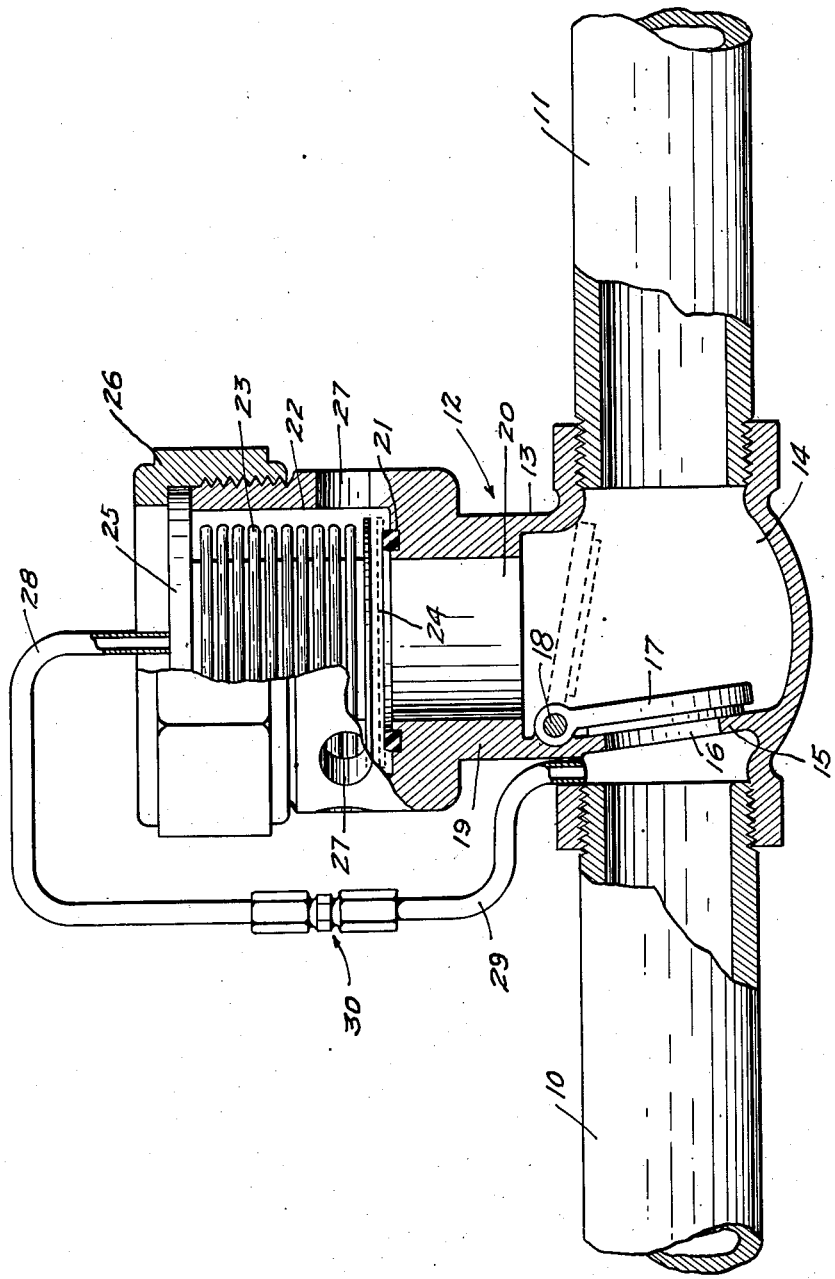
INVENTOR,
STEPHEN M. DUNN.
BY James M. Abbott
ATTORNEY.

Patented Aug. 11, 1942

2,292,871

UNITED STATES PATENT OFFICE 2,292,871

ANTISIPHONAGE RELIEF VALVE

Stephen M. Dunn, Los Angeles, Calif.

Application May 19, 1941, Serial No. 394,131

8 Claims. (Cl. 277—61)

This invention relates to public water supply and plumbing equipment, and particularly pertains to an anti-siphonage relief valve.

In connection with water supply to plumbing systems in residences, apartment houses, hotels, and the like, and to industrial apparatus in which water is delivered from service mains to such plumbing systems and apparatus, the hydraulic gradient of the water in the connecting pipe between the service main and the plumbing system under conditions of normal flow slopes from the service main toward the plumbing system. However, due to conditions either in the service main system or in the plumbing system which frequently occur, the direction of slope of the hydraulic gradient may be reversed, with a consequent tendency for the direction of flow in the connecting pipe to be reversed. This flow in the reverse direction is commonly termed back-siphonage or back-flow, and is a source of danger of contamination of public water supplies by sewage and chemicals which may have ingress to the plumbing system. Such back-siphonage may be prevented by the interposition of a tightly seating check valve in the connecting pipe, but such valves frequently become leaky and thus may fail to perform their intended function.

The principal object of the present invention is to provide an automatically acting valve structure suitable for interposition in the connecting pipe between the service main and the plumbing system, incorporating a check valve for preventing reversal of flow, and in addition incorporating means for releasing any considerable excess in pressure of the water in the plumbing system over and above the pressure in the service main, thus preventing reversal of the direction of slope of the hydraulic gradient.

The invention is illustrated by way of example in the accompanying drawing, in which the figure is a view in vertical elevation and partial section to show the construction and application of the present invention.

Referring more particularly to the drawing, 10 indicates a service line through which water may be delivered to a domestic line 11. Interposed between the lines 10 and 11 is a valve structure 12. This valve structure comprises a valve housing 13 having a central valve chamber 14 at the opposite sides of which the lines 10 and 11 connect. On the side of the valve housing adjacent to the service line connection is a valve seat 15 having an opening 16 therein. This seat is inclined slightly with relation to the vertical. Pivotally mounted within the valve housing and in position to lie against the seat is a flapper valve 17 which is mounted at its upper edge upon a pivot pin 18 and which may swing toward and away from its seat. It will be understood that any standard check valve may be used if desired. The valve is designed to swing away from its seat when the pressure of water within the service line 10 is greater than the pressure of water within the domestic line 11. This valve will tend to swing toward its seat when the pressure in the domestic line is greater than that in the service line, and when the pressure in service line 10 and domestic line 11 are equal or static. The valve housing 13 has an upper cylindrical extension 19 formed with a central bore 20. A valve seat 21 is formed around the upper lip of this extension. A counterbore 22 is formed within the upper portion 19 and accommodates a Sylphon bellows 23 which carries a valve disc 24 normally resting against the valve seat 21. The upper end of the Sylphon bellows is carried by a disc 25 held in place by a ring nut 26. Exhaust ports 27 are formed through the side walls of the extension portion and establish communication between the counterbore 22 and the atmosphere. The upper end of the Sylphon bellows is in communication with a tube 28 through which fluid may pass to and from the bellows. A complementary tube 29 is connected to the valve housing at a point between the service line 10 and the valve seat 16. A union 30 is provided to connect the abutting ends of the tubes 28 and 29.

In the operation of the present invention water under pressure normally flows through the valve from the service line 10 to the domestic line 11. This flow swings the valve 17 from its seat by a sufficient amount to permit the passage of the quantity of water flowing, and pressure in the service line 10 will exceed the pressure in the domestic line 11 by an amount which will be dependent on the quantity of water flowing and the amount of frictional resistance inherent in the valve. If, due to conditions arising either in the service line 10 or the domestic line 11, the flow tends to reverse, the pressure in the domestic line 11 will exceed the pressure in the service line 10 and the valve 17 will be held against its seat, thus preventing the flow in the reverse direction. It is then essential that the excess pressure in the domestic line 11 be relieved, as any leakage of the valve 17 might permit the flow of a dangerously large quantity of contaminated water from the domestic line 11 into the service line 10 and thence into the service main to which service line 10 is connected, This essential release of water pressure is brought about by the fact that the force holding valve disc 24 against its seat 21 is equal to the difference between the force exerted by the Sylphon bellows 23, which is inflated by water under the pressure existing in service line 10, and the force exerted against the under side of valve disc 24 by water under the pressure existing in domestic line 11, and may be either positive or negative accordingly as the pressure in service line 10 is greater or less than the pressure in domestic line 11. Consequently, when the pressure in domestic line 11 becomes greater than the pressure in service line 10 and leakage past valve 17 might occur, valve 24 will be raised from seat 21 and will remain in the raised position until sufficient water has escaped from domestic line 11 to cause the pressure therein to fall as low as the pressure in service line 10. When the pressure in domestic line 11 has fallen to approximately the same value as the pressure in service line 10, valve 24 will come into contact with seat 21 and will prevent further escape of water as long as the pressure in domestic line 11 does not exceed the pressure in service line 10.

Attention is directed to the fact that the effective area of the Sylphon bellows is greater than the area of the valve disc 24, which is exposed to the pressure within the valve body, and that, in consequence, the valve will be held against its seat with a slight force at all times when the pressure in the service line 10 is equal to, or greater than, the pressure in domestic line 11. This force will be equal to the difference between the force exerted by the Sylphon bellows 23 tending to hold the valve to its seat and the force exerted by the pressure of the fluid within the valve body against the underside of valve 24. The seating force will be equal to the pressure in the bellows 23 multiplied by the effective area of the bellows. The unseating force will be equal to the pressure in the valve passage 20, multiplied by the area of the valve opening. The difference between these two forces, which may be either a positive or a negative quantity, will be the force controlling the movement of the relief valve disc. This force may be derived by the following mathematical expression:

$$F = P_1 \times A_s - P_2 \times A_v$$

F = Seating force, may be plus or minus
$P_1$ = Inlet pressure
$P_2$ = Pressure in valve passage
$A_s$ = Effective area of bellows
$A_v$ = Area of valve disc exposed to pressure in valve body It will be seen that the valve disc 24 will not be lifted from its seat unless the pressure in domestic line 11 exceeds the pressure in service line 10 by an amount which will reduce the value of the force F to zero, or to a negative value. When force F becomes zero the ratio between the pressure $P_1$ and $P_2$ will be the same as the ratio between the areas $A_s$ and $A_v$, but in the inverse order. This latter fact makes it possible to vary the amount of force F by which the valve disc 24 is held to its seat by varying the relation between the effective areas of the valve disc 24 and the Sylphon bellows 23, by which means assurance may be had that flapper valve 17 is securely forced to its seat 15 before valve disc 24 is raised.

It will thus be seen that the structure here disclosed is simple in construction, comprises few moving parts, and that it will operate automatically and directly to relieve any excess in pressure above a predeterminable amount in the domestic line above the pressure in the service line, and will expel to the atmosphere the quantity of fluid required to prevent the existence of such an excess of pressure.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A relief valve structure through which a fluid may flow from an inlet end to an outlet end thereof, including check valve means interposed in the line of said fluid flow arranged to open automatically when the pressure of the fluid at the inlet end of said relief valve structure exceeds the pressure of the fluid at the outlet end and to close automatically when the pressure of the fluid at the outlet end exceeds the pressure at the inlet end of said relief valve structure, and relief valve means normally held closed by the pressure of fluid in the inlet line and adapted to open automatically under said last named condition, whereby fluid from the space within the relief valve structure between said check valve means and the outlet end of said relief valve structure may be discharged from the flow stream.

2. A relief valve structure through which a fluid may flow from an inlet end to an outlet end thereof, including check valve means interposed in the line of said fluid flow arranged to open automatically when the pressure of the fluid at the inlet end of said relief valve structure exceeds the pressure of the fluid at the outlet end and to close automatically when the pressure of the fluid at the outlet end exceeds the pressure at the inlet end of said relief valve structure, relief valve means normally held closed by the pressure of fluid in the inlet line and adapted to open automatically under said last named condition, whereby fluid from the space within the relief valve structure between said check valve means and the outlet end of said relief valve structure may be discharged from the flow stream, and means cooperating with said relief valve and affected by the pressure of the fluid at the inlet end of said relief valve structure tending to hold said relief valve means in the closed condition.

3. A relief valve structure through which a fluid may flow from an inlet end to an outlet end thereof, including check valve means interposed in the line of said fluid flow arranged to open automatically when the pressure of the fluid at the inlet end of said relief valve structure exceeds the pressure of the fluid at the outlet end and to close automatically when the pressure of the fluid at the outlet end exceeds the pressure at the inlet end of said relief valve structure, relief valve means normally held closed by the pressure of fluid in the inlet line and adapted to open automatically under said last named condition, whereby fluid from the space within the relief valve structure between said check valve means and the outlet end of said relief valve structure may be discharged from the flow stream, and means cooperating with said relief valve and affected by the pressure of the fluid at the inlet end of said relief valve structure tending to hold said relief valve means in the closed condition until the pressure of the fluid at the outlet end of said relief valve structure exceeds the pressure at the inlet end by a predetermined amount.

4. A device of the character described, including a valve housing connectible to an inlet pipe and to an outlet pipe, a check valve within said valve housing and interposed in a passageway whereby fluid may flow from one of said pipes to the other, a relief valve housing in constant communication with said valve housing, said relief valve housing having a relief valve, said relief valve being normally seated to prevent egress of fluid from the interior of said relief valve housing to the exterior thereof, and means tending to hold said relief valve in the closed position by direct action of the pressure of fluid in the inlet line until the pressure of the fluid within the relief valve housing exceeds the pressure of the fluid in the inlet pipe by a predetermined amount whereupon said relief valve will open.

5. A device of the character described, including a valve housing connectible to an inlet pipe and to an outlet pipe, a check valve within said valve housing and interposed in a passageway whereby fluid may flow from one of said pipes to the other, a relief valve housing in constant communication with said valve housing, said relief valve housing having a relief valve, said relief valve being normally seated to prevent egress of fluid from the interior of said relief valve housing to the exterior thereof, and means tending to hold said relief valve in the closed position until the pressure of the fluid within the relief valve housing exceeds the pressure of the fluid in the inlet pipe by a predetermined amount whereupon said relief valve will open, said means tending to hold said relief valve in the closed position including a Sylphon bellows restrained at one end by the relief valve and at the other end by an extension of the relief valve housing and exposed internally to the fluid pressure existing at the inlet end of the valve housing.

6. A device of the character described, including a valve housing connectible to an inlet pipe and to an outlet pipe, a check valve within said valve housing and interposed in a passageway whereby fluid may flow from one of said pipes to the other, a relief valve housing in constant communication with said valve housing, said relief valve housing having a relief valve, said relief valve being normally seated to prevent egress of fluid from the interior of said relief valve housing to the exterior thereof, means tending to hold said relief valve in the closed position until the pressure of the fluid within the relief valve housing exceeds the pressure of the fluid in the inlet pipe by a predetermined amount whereupon said relief valve will open, said means tending to hold said relief valve in the closed position including a Sylphon bellows restrained at one end by the relief valve and at the other end by an extension of the relief valve housing and exposed internally to the fluid pressure existing at the inlet end of the valve housing, and a conduit for delivering fluid under pressure from said inlet end to said bellows.

7. A device of the character described, consisting of a hollow valve body with an inlet end connection and an outlet end connection, check valve means within the valve body adjacent to the inlet end adapted to remain closed so long as the pressure at the inlet end does not exceed the pressure at the outlet end, relief valve means within an extension of the valve body permitting flow of fluid from the space within the valve body to the exterior of the valve body when open, and pressure operated means connected by means of a duct to the inlet end for maintaining the relief valve in sealing contact with its seat so long as the pressure at the inlet end is not inferior to the pressure within the valve body by a predetermined amount.

8. A device of the character described, consisting of a valve body having an inlet end and an outlet end and an internal passage therebetween, check valve means adjacent to the inlet end adapted to prevent flow through the internal passage from the outlet end toward the inlet end, and exhaust valve means in the valve body consisting of an opening in the wall of the internal passage closed by a valve disc held in the seated position by the force exerted by an axially expansible bellows exposed internally to fluid pressure piped from the inlet side of the check valve means, so long as the pressure of the fluid in the internal passage does not exceed the pressure of the fluid in the bellows by a predetermined amount.

STEPHEN M. DUNN.